US 9,008,860 B2

(12) United States Patent
Waldock et al.

(10) Patent No.: US 9,008,860 B2
(45) Date of Patent: Apr. 14, 2015

(54) TOUCH-SCREEN VEHICLE REMOTE CONTROL

(75) Inventors: Anthony James Waldock, Bristol (GB); Gemma Anne Innes-Jones, Bristol (GB); Peter Stephen Day, Bristol (GB)

(73) Assignee: BAE Systems plc (GB)

( * ) Notice: Subject to any disclaimer, the term of this patent is extended or adjusted under 35 U.S.C. 154(b) by 678 days.

(21) Appl. No.: 13/148,228

(22) PCT Filed: Feb. 5, 2010

(86) PCT No.: PCT/GB2010/050186
§ 371 (c)(1),
(2), (4) Date: Aug. 5, 2011

(87) PCT Pub. No.: WO2010/089606
PCT Pub. Date: Aug. 12, 2010

(65) Prior Publication Data
US 2012/0029731 A1  Feb. 2, 2012

(30) Foreign Application Priority Data
Feb. 6, 2009 (EP) .................................. 09275007
Feb. 6, 2009 (GB) ................................. 0901908.4

(51) Int. Cl.
*G05D 1/00* (2006.01)
*G08B 5/22* (2006.01)
*G06F 3/0489* (2013.01)
*G06Q 10/02* (2012.01)

(52) U.S. Cl.
CPC .............. *G05D 1/0044* (2013.01); *G08B 5/221* (2013.01); *G06F 3/0489* (2013.01); *G06Q 10/02* (2013.01)

(58) Field of Classification Search
USPC ........ 701/2, 28, 451, 517, 400, 532; 244/190; 340/426, 16, 4.61; 455/404.2; 700/66, 700/83, 15; 341/173, 176; 345/173, 156, 345/581, 418, 1
IPC .............. G05D 1/0044,1/0094; B64C 2201/146
See application file for complete search history.

(56) References Cited

U.S. PATENT DOCUMENTS

2001/0037163 A1  11/2001  Allard
2003/0158638 A1*  8/2003  Yakes et al. ..................... 701/22

(Continued)

FOREIGN PATENT DOCUMENTS

EP  PCT/GB2010/050186  *  8/2011
GB  2009GB-0901908.4   *  2/2009

(Continued)

OTHER PUBLICATIONS

Software for the next-generation automobile; Simonds, C.; IT Professional ; vol. 5 , Issue: 6; Digital Object Identifier: 10.1109/MITP.2003.1254962; Publication Year: 2003 , pp. 7-11.*

(Continued)

*Primary Examiner* — Cuong H Nguyen
(74) *Attorney, Agent, or Firm* — Finch & Maloney PLLC

(57) ABSTRACT

A vehicle remote control device includes a communications device for transferring vehicle movement control signals to a remote vehicle and a touch-screen interface configured to present a graphical representation of the remote vehicle and to allow a user to manipulate the graphical representation on the touch-screen. A conversion component converts the manipulation of the graphical representation into vehicle control signals for transfer by the communications device.

14 Claims, 2 Drawing Sheets

(56) References Cited

U.S. PATENT DOCUMENTS

| | | | |
|---|---|---|---|
| 2004/0024502 A1* | 2/2004 | Squires et al. | 701/33 |
| 2005/0113944 A1 | 5/2005 | Santarossa | |
| 2005/0273218 A1* | 12/2005 | Breed et al. | 701/2 |
| 2007/0168116 A1 | 7/2007 | Meyer zu Helligen et al. | |
| 2008/0027591 A1* | 1/2008 | Lenser et al. | 701/2 |
| 2008/0040426 A1* | 2/2008 | Synstelien et al. | 709/203 |
| 2008/0114513 A1* | 5/2008 | Pillar et al. | 701/41 |
| 2009/0091547 A1* | 4/2009 | Kikuoka | 345/173 |
| 2010/0114471 A1* | 5/2010 | Sugiyama et al. | 701/200 |
| 2010/0179691 A1 | 7/2010 | Gal et al. | |
| 2010/0309148 A1* | 12/2010 | Fleizach et al. | 345/173 |
| 2011/0156943 A1* | 6/2011 | Wong et al. | 341/176 |
| 2014/0028568 A1* | 1/2014 | St. Clair | 345/169 |
| 2014/0096051 A1* | 4/2014 | Boblett et al. | 715/769 |
| 2014/0365120 A1* | 12/2014 | Vulcano et al. | 701/532 |
| 2014/0365126 A1* | 12/2014 | Vulcano et al. | 701/533 |

FOREIGN PATENT DOCUMENTS

| | | |
|---|---|---|
| WO | WO 2008/135978 A2 | 11/2008 |
| WO | WO 2008/144135 A1 | 11/2008 |

OTHER PUBLICATIONS

A research and implementation of on-vehicle detection System of Hybrid Electric Vehicle; Shuqiu Li ; Shufen Liu ; Liang Xia ; Wanbo Zheng ; Xiaoyan Wang; Computer-Aided Industrial Design & Conceptual Design, 2009. CAID & CD 2009. IEEE 10th Inter Conf on ; Digital Obj Id: 10.1109/CAIDCD.2009.5374876; Pub Year: 2009; pp. 2082-2085.*

Precise manipulation of GUI on a touch screen with haptic cues;Ki-Uk Kyung et al., EuroHaptics conference, 2009 and Symposium on Haptic Interfaces for Virtual Environment and Teleoperator Systems. World Haptics 2009. Third Joint; Digital Object Identifier: 10.1109/WHC.2009.4810865; Pub Year: 2009 , pp. 202-207.*

Evaluation of on screen navigational methods for a touch screen device; HoSiyong, A. ; Kenny, C.; Human-Robot Interaction (HRI), 2010 5th ACM/IEEE International Conference on; Digital Object Identifier: 10.1109/HRI.2010.5453258 Publication Year: 2010 , pp. 83-84.*

Embedded Model Control Application to Drag-Free and Satellite-to-Satellite Tracking; Massotti, L. ; Canuto, E. ; Silvestrin, P. Control and Automation, 2006. MED'06. 14th Mediterranean Conference on; Digital Object Identifier: 10.1109/MED.2006.328708 Publication Year: 2006 , pp. 1-6.*

Bio-inspired topology control mechanism for autonomous underwater vehicles used in maritime surveillance; Jianmin Zou ; Gundry, S. ; Kusyk, J. ; Sahin, C.S. ; Uyar, M.U.; Technologies for Homeland Security (HST), 2013 IEEE International Conference on; DOI: 10.1109/THS.2013.6699000; Publication Year: 2013 , pp. 201-206.*

An interactive driver assistance system monitoring the scene in and out of the vehicle; Petersson, L. ; Fletcher, L. ; Barnes, N. ; Zelinsky, A.;Robotics and Automation, 2004. Proceedings. ICRA '04. 2004 IEEE International Conference on; vol. 4 DOI: 10.1109/ROBOT.2004.1308791; Publication Year: 2004 , pp. 3475-3481 vol. 4.*

Receive Side Processing for Automotive Hands-Free Systems; Iser, B. ; Schmidt, G.; Hands-Free Speech Communication and Microphone Arrays, 2008. HSCMA 2008; DOI: 10.1109/HSCMA.2008.4538730; ; Publication Year: 2008 , pp. 236-239.*

Nonlinear control experiment of RC car using internet; Aoto, K. ; Inoue, M. ; Nagshio, T. ; Kida, T.; Control Applications, 2005. CCA 2005. Proceedings of 2005 IEEE Conference on; DOI: 10.1109/CCA.2005.1507357; Publication Year: 2005 , pp. 1575-1580.*

Chasing an elusive target with a mobile robot; Coue, C. ; Bessiere, P.; Intelligent Robots and Systems, 2001. Proceedings. 2001 IEEE/RSJ International Conference on; vol. 3; DOI: 10.1109/IROS.2001.977172; Publication Year: 2001 , pp. 1370-1375 vol. 3.*

A scaled-down testbed for human driver modeling and evaluation; Yeung Yam ; Kai Man Tong; Robotics, Intelligent Systems and Signal Processing, 2003. Proceedings. 2003 IEEE International Conference on; vol. 1; DOI: 10.1109/RISSP.2003.1285603 Publication Year: 2003 , pp. 376-381 vol. 1.*

International Search Report (PCT/ISA/210) for PCT/GB2010/050186 dated May 10, 2010.

Written Opinion (PCT/ISA/237) for PCT/GB2010/050186 dated May 10, 2010.

European Search Report for EP 09275007 dated Jun. 19, 2009.

United Kingdom Search Report for GB 0901908.4 dated May 11, 2009.

T. Fong et al., "Novel Interfaces for Remote Driving: Gesture, Haptic and PDA", Mobile Robots XV ND Telemanipulator and Telepresence Technologies VII, 2001, pp. 300-311, vol. 4195.

M. Montemerlo et al., "Carmen. Robot Navigation Toolkit", Carnegie Mellon University, Field Robotics Center, Feb. 2008, retrieved from internet: http://web.archive.org/web/20080206184107/http://carmen.sourceforge.net.

U Kartoun, "Tele-Control of a Mobile Robot Using Touch Screen Interface", Ben Gurion University of the Negev, Aug. 1, 2007, retrieved from internet: http://www.youtube.com/watch?v=4sxHRVv.

* cited by examiner

TOUCH-SCREEN VEHICLE REMOTE CONTROL

The present invention relates to remote control of vehicles using a touch-screen interface.

Various types of devices for remote control of vehicles are known. Many of these either attempt to replicate vehicle on-board controls or provided a simplified user interface, such as a joystick. Such controllers can be difficult to use in certain conditions, e.g. when the user is wearing thick/wet gloves, and such problems can be particularly acute when the size of the controller on the remote control device is relatively small. Design issues like these can make the controller impossible to use without removing the gloves, or at least decreases the precision with which the user is able to control the vehicle. Electro-mechanical controllers such as joysticks are also susceptible to damage, e.g. caused by ingress of sand when used in desert conditions and normally require the use of a flat surface or two hands.

Embodiments of the present invention are intended to provide a vehicle remote control device that is easy to use when wearing gloves or the like.

According to one aspect of the present invention there is provided a vehicle remote control device including:

a communications device for transferring vehicle movement control signals to a remote vehicle;

a touch-screen interface configured to present a graphical representation of the remote vehicle and to allow a user to manipulate the graphical representation on the touch-screen, and a conversion component configured to convert the manipulation of the graphical representation into vehicle control signals for transfer by the communications device.

The touch-screen interface may be configured to allow the user to drag the graphical representation around the touch-screen. The vehicle control signals may control movement of the vehicle.

The conversion component may convert manipulation of the graphical representation in a first direction, e.g. towards an upper edge of the screen, into a change, e.g. increase, speed vehicle control signal.

The conversion component may convert manipulation of the graphical representation in a further direction, e.g. towards a side edge of the screen, into a change steering, e.g. increase right/left turn rate, vehicle control signal.

The touch-screen interface may be configured so that manipulating the graphical representation in a first part of the screen results in a first rate of vehicle movement (e.g. speed or turning) change and manipulating the graphical representation in another part of the screen results in a different rate of vehicle movement change.

The touch-screen interface may be configured to provide a deadband effect, where vehicle speed and/or turn rate are modified to assist the user with moving the remote vehicle in a straight line and/or turn the remote vehicle on a spot.

The graphical representation may be positioned in a default, e.g. central, position on the touch-screen when not being manipulated by the user. The default position may vary according to a type of the remote vehicle. For example, for a vehicle not capable of processing a "move backwards" vehicle control signal, the default position may be located at or adjacent a lower edge of the screen, which can enable finer fidelity of the valid control signals. The graphical representation may change to indicate a state (e.g. static or moving) of the remote vehicle.

The device may further include a component configured to transmit a locating signal to the remote vehicle.

The touch-screen interface may be configured to display an image received from a remote imaging device, e.g. video camera, located onboard the remote vehicle.

The touch-screen interface may be configured to present alternative vehicle control modes. The alternative vehicle control modes may be selected from a set: continuously follow a locating signal transmitted by the device; move to/towards a current geographical position of the device.

The device may comprise a personal digital assistant device.

According to another aspect of the present invention there is provided a method of remote control of a vehicle, the method including:

presenting a graphical representation of a remote vehicle on a touch-screen interface;

allowing a user to manipulate the graphical representation on the touch-screen;

converting the manipulation of the graphical representation into vehicle control signals, and transferring the vehicle control signals to the remote vehicle.

According to yet another aspect of the present invention there is provided a computer program product comprising a computer readable medium, having thereon computer program code means, when the program code is loaded, to make the computer execute a method of remote control of a vehicle substantially as described herein.

According to another aspect of the present invention there is provided a vehicle configured to receive remote control signals from a device substantially as described herein.

According to yet another aspect of the present invention there is provided a system including a device substantially as described herein and a vehicle (or a vehicle control apparatus) configured to receive remote control signals from the device.

According to a further aspect of the present invention there is provided a vehicle remote control device including:

a communications device for transferring vehicle movement control signals to a remote vehicle;

a touch-screen interface including a selection of vehicle operation modes.

A method corresponding to this further aspect is also provided.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
FIG. 1 is a block diagram of a remote control device and a vehicle.

FIG. 1 shows a remote control device 100. The device 100 may be any suitable portable electronic device, but it is preferred that it is a rugged device such as a Getac PDA available from GETAC, Inc of Lake Forest, Calif. 92630, USA. Schematically, the device includes a processor 102 and internal memory 104. It also includes a touch-screen interface 106 that is capable of displaying information and receiving input. The device further includes a communications interface 108 for communicating with remote devices. The memory contains code that is executed by the processor in order to allow a user to use the touch-screen to transmit remote control signals via the communications interface.

In the example, the device 100 is used to remotely control an un-manned vehicle 110 that has been configured to be operated by remote control via a communications interface 112 that is linked to a processor 114. The processor is capable of operating steering, traction and/or other functions of the vehicle. An example of a suitable remotely-controllable vehicle is Terrier® produced by BAE Systems. The signals transmitted by the device 100 may be compatible with remote control system already fitted in a vehicle, or the vehicle control system may be modified (including fitting additional remote control signal-receiving components) to cooperate with the device.

Figure 2:
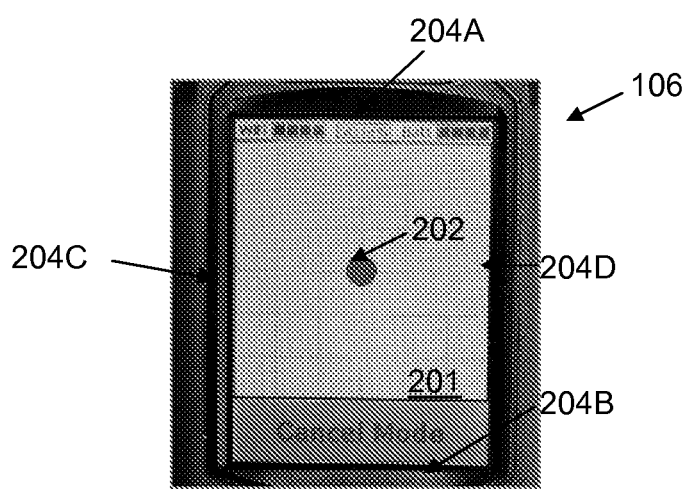
FIGS. 2 to 4 are example screen displays generated by the remote control device.

Turning to FIG. 2, an example of how the touch-screen 108 can be set up to provide vehicle remote control functionality is shown. The touch-screen includes a grid background 201 and a red dot 202 is positioned substantially centrally on the grid, where each square on the grid in a vertical direction can represent a change in speed and each square on the grid in a horizontal direction can represent a change in turn rate, as will be described below. The dot 202 acts as a graphical representation of the vehicle and it will be understood that any other shape/graphic could be used to represent the vehicle/a controller for the vehicle. The circumference of the dot 202 in the example is around 1-2 cm, which means that it can easily be touched and manipulated by a gloved fingertip. The shape of the dot can change dependant on the state of the vehicle, e.g. the shape can alert the user to the vehicle being in a moving state by changing from a circle to a triangle.

In use, a user touches the dot 202 and then manipulates it in accordance with how the remote vehicle 110 is to be moved. One example of how interaction with the touch-screen to remotely control a vehicle having variable forward/rearward speed and steering control, e.g. a vehicle having Ackerman or skid-steering, is given below:

In order to move the vehicle forwards, the user drags the dot 202 towards the upper edge 204A of the screen. The closer to the edge 204A the dot is dragged, the more the forwards speed is to be increased.

In order to move the vehicle backwards, the user drags the dot 202 towards the lower edge 204B of the screen. The closer to the edge 204B the dot is dragged, the more the rearward speed is to be increased.

In order to change the vehicle turn rate to the left, the user drags the dot 202 towards the left-hand edge 204C of the screen. The closer to the edge 204C the dot is dragged, the more the left turn rate is increased.

In order to change the vehicle turn rate to the right, the user drags the dot 202 towards the right-hand edge 204D of the screen. The closer to the edge 204D the dot is dragged, the more the right turn rate is increased.

The interactions described above are converted by the code executing on the device's processor 102, which also produces the user interface displays, into signals that are transmitted to the vehicle 110 via the communications interface 108. When the user breaks contact with the dot 202, the dot returns to the default position at the centre of the screen and no vehicle control signals are transmitted.

An example of how dragging the dot can affect the movement of the vehicle is given below:

dragging the dot upwards one square on the grid increases speed by 0.5 meters per second;

dragging the dot sideways by one grid square increases turn rate by 30 degrees per second.

The scale used by the remote control application to change the manipulation of the dot into speed or turn rate can be dynamically altered, e.g. each grid square can represent a constant speed (0.5 ms$^2$), or the speed could be increased at certain portions of the screen, e.g. at the top. Having a non-linear scale can allow for finer control at low speeds, whilst allowing high-speed operation. Also, the movement left or up may be linked. For example, the turn rate could be reduced at high-speed to enable safe control (i.e. not allowing sharp turns at high speed). Further, a deadband can be introduced into the speed and turn rate to allow the user to easily move the vehicle in a straight line or turn on the spot (if the vehicle supports this mode of operation).

The screen can also display further information, e.g. battery life, GPS signal strength, connection status with the vehicle (i.e. the strength of the signal between the PDA and the vehicle) and the like.

It will be understood that many variations to the interaction between the touch-screen and vehicle control are possible. For instance, where a vehicle has no backwards drive then the application may prevent downwards dragging of the dot 202. Alternatively, the default location of the dot may be at the bottom edge 204B of the screen so that it is not possible to move it further down. It will be understood that the remote control application can be modified in order to control other functions or subsystems on the vehicle, e.g. lights or winches, in addition to (e.g. by means of additional touch buttons on the display of FIG. 2), or instead of, the movement control. For vehicles other than land vehicles having Ackerman/skid steering, the interface may be modified accordingly. For example, dragging the dot upwards/downwards on the screen could be used to alter the altitude of an aircraft and dragging the dot sideways could alter its roll. Similar variations could be provided for waterborne or underwater vehicles.

Figure 3:
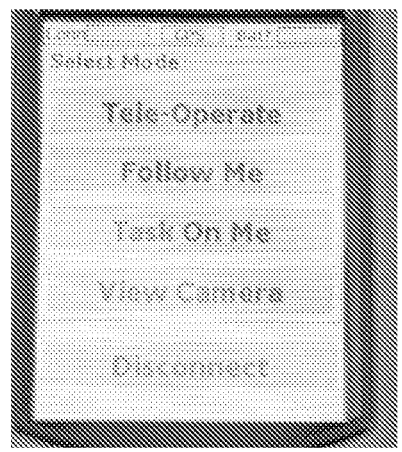

FIG. 3 shows the touch-screen 108 displaying a menu including a set of remote vehicle operation modes. The "Tele-Operate" option takes the user to the remote control described above (touching the "Cancel Mode" area on the display of FIG. 2 stops that mode and returns the user to the menu). The "Follow Me" option sends signals to the remote vehicle for it to follow a locating signal transmitted by the device 100, which means that the vehicle effectively follows the person/vehicle holding the device 100, with the vehicle keeping a certain distance (e.g. a preset distance of around 35 meters) behind the locating signal. In the Follow Me mode, the device 100 transmits information (GPS location or any other signal) to the vehicle. This information is used by the vehicle's processor to construct a route to follow.

Figure 4:
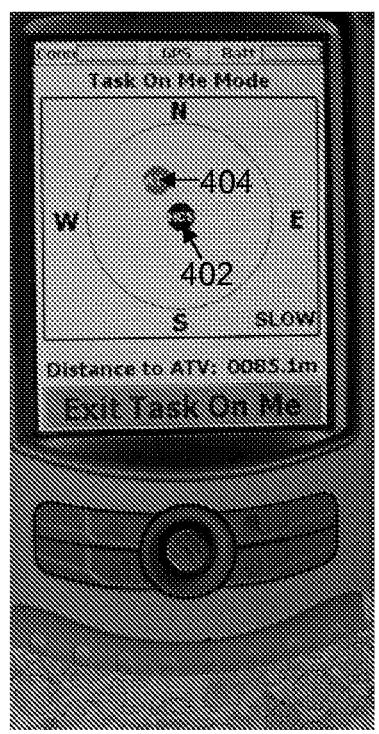

The "Task On Me" option issues signals to the vehicle to move to the current position of the device 100. The signal conveying the current position of the device to the vehicle may be based on GPS information. Again, this information may be used by the vehicle's processor to work out the path to traverse. FIG. 4 shows an example screen displayed by the device 100 when in the Task On Me mode (a similar display may also be provided for the Follow Me mode). The location of the device 100 is represented by the central dot 402 and the position of the remote vehicle by dot 404. Other information, such as compass bearings and the distance between the device and the vehicle can also be included on the display. The display is updated as the vehicle/device position changes. The Follow Me/Task On Me interface can also include controls to enable the user to change the speed of the vehicle and/or the distance between the vehicle and the device. Variations to these types of display are possible, e.g. the screen could be augmented with a map of the area and the location of other similar types of PDA devices in the environment.

The "View Camera" option in the menu of FIG. 3 displays images received from a remote source, typically from an imaging device such as a camera or infra-red sensor, onboard the remote vehicle. The "Disconnect" option ceases the communication link between the device 100 and the vehicle 110.

The invention claimed is:

1. A vehicle remote control device including:
    a communications device for transferring vehicle movement control signals to a remote vehicle;
    a touch-screen interface configured to present a graphical representation of the remote vehicle and to allow a user to manipulate the graphical representation on the touch-screen interface; and
    a conversion component configured to convert the manipulation of the graphical representation into vehicle control signals for transfer by the communications device,
    wherein the touch-screen interface is configured to allow a user to drag the graphical representation around a touch-screen in order to control movement of the vehicle.

2. A method of remote control of a vehicle, the method including:
    presenting a graphical representation of the vehicle on a touch-screen interface of a remote device;
    detecting manipulation of the graphical representation on a touch-screen, wherein the graphical representation is dragged around the touch screen in order to control movement of the vehicle;
    converting the manipulation of the graphical representation into vehicle control signals; and
    transferring the vehicle control signals to the remote vehicle.

3. A device according to claim 1, wherein the conversion component is configured to convert manipulation of the graphical representation in a particular direction into a change speed vehicle control signal.

4. A device according to claim 1, wherein the particular direction is at least one of towards an upper edge of the touch screen or towards a side edge of the touch screen.

5. A device according to claim 1, wherein the graphical representation is positioned in a default position on the touch-screen when not being manipulated by the user.

6. A device according to claim 1, wherein the touch-screen interface is configured such that manipulating the graphical representation in a first part of the screen results in a first rate of vehicle movement change, and manipulating the graphical representation in another part of the screen results in a different rate of vehicle movement change.

7. A device according to claim 1, wherein the touch-screen interface is configured to provide a deadband effect, where speed and/or turn rate of the remote vehicle is modified to assist the user with moving the remote vehicle in a straight line and/or turn the remote vehicle on a spot.

8. A device according to claim 1, comprising:
    a component configured to transmit a locating signal to the remote vehicle.

9. A device according to claim 1, wherein the touch-screen interface is configured to allow the user to choose at least one alternative vehicle control mode selected from: continuously follow a locating signal transmitted by the device; and move towards a current geographical position of the device.

10. A device according to claim 6, wherein the first rate of vehicle movement change is at least one of speed or turning.

11. A computer program product comprising a tangible computer readable medium, having thereon computer program code instructions to make a computer execute a method of remote control of a vehicle comprising:
    presenting a graphical representation of the vehicle on a touch-screen interface of a remote device;
    detecting manipulation of the graphical representation on a touch-screen, wherein the graphical representation is dragged around the touch screen in order to control movement of the vehicle;
    converting the manipulation of the graphical representation into vehicle control signals; and
    transferring the vehicle control signals to the remote vehicle.

12. A vehicle configured to receive remote control signals from a device according to claim 1.

13. A method as in claim 2, wherein the touch-screen interface is configured to allow the user to choose at least one alternative vehicle control mode selected from: continuously following a locating signal transmitted by the device; and moving towards a current geographical position of the device.

14. A device according to claim 5, wherein the default position is a center of the touch screen.

* * * * *